United States Patent
Foster

(10) Patent No.: US 8,464,702 B2
(45) Date of Patent: Jun. 18, 2013

(54) SMOKER CONVERSION KIT

(76) Inventor: Frank P. Foster, Itasca, IL (US)

( * ) Notice: Subject to any disclaimer, the term of this patent is extended or adjusted under 35 U.S.C. 154(b) by 763 days.

(21) Appl. No.: 12/661,260

(22) Filed: Mar. 15, 2010

(65) Prior Publication Data

US 2010/0269713 A1    Oct. 28, 2010

Related U.S. Application Data

(63) Continuation-in-part of application No. 12/069,135, filed on Feb. 8, 2008, now abandoned.

(51) Int. Cl.
*A23B 4/04* (2006.01)
*A47J 27/00* (2006.01)

(52) U.S. Cl.
USPC ............. 126/25 R; 126/369; 99/409; 99/419; 99/482; 99/444 X

(58) Field of Classification Search
USPC .................. 126/25 R, 369; 99/446, 448, 442, 99/482
See application file for complete search history.

(56) References Cited

U.S. PATENT DOCUMENTS

| | | | |
|---|---|---|---|
| 1,773,141 A | 8/1930 | Hodgson | |
| 3,752,121 A | 8/1973 | Brazzell | |
| 4,467,709 A | 8/1984 | Anstedt | |
| 4,528,975 A * | 7/1985 | Wang | 126/369 |
| 4,633,773 A | 1/1987 | Jay | |
| D307,201 S | 4/1990 | Gold | |
| 5,081,916 A * | 1/1992 | Kuhling et al. | 99/419 |
| 5,495,845 A | 3/1996 | Hait | |
| 6,079,363 A | 6/2000 | MacLaine | |
| 6,119,588 A | 9/2000 | Tiemann | |
| 6,742,446 B2 * | 6/2004 | McLemore et al. | 99/421 V |
| 7,059,318 B2 | 6/2006 | Cornfield | |
| 7,281,469 B1 * | 10/2007 | Barbour et al. | 99/426 |
| 2004/0200359 A1 * | 10/2004 | Snider | 99/446 |
| 2005/0039612 A1 * | 2/2005 | Denny | 99/450 |
| 2006/0191488 A1 | 8/2006 | Ricchiuti | |
| 2012/0107476 A1 * | 5/2012 | McLemore et al. | 426/523 |

OTHER PUBLICATIONS

Smoker—google.*
Smoker and Grill in one—google search.*

* cited by examiner

*Primary Examiner* — Steven B McAllister
*Assistant Examiner* — Nikhil Mashruwala

(57) ABSTRACT

This invention is to be used primarily to convert a traditional charcoal grill into a multifaceted smoker with wet and dry smoking capabilities. Furthermore, novel racks within the invention allow the user to utilize all of the space within the smoker providing for more food cooked over a given time frame. The invention also included a removal tray allowing access to the fuel and liquid pan with only negligible heat loss and no risk of damage to the contents of the smoker or the surface upon which the smoker is placed when removed from the primary heat source.

10 Claims, 11 Drawing Sheets

SMOKER CONVERSION KIT

RELATION BACK TO PREVIOUS APPLICATION

This Continuation in Part Application claims priority and filing date from application Ser. No. 12/069,135 which was filed on Feb. 8, 2008 now abandoned.

STATEMENT REGARDING FEDERALLY SPONSORED RESEARCH AND DEVELOPMENT

Not Applicable

REFERENCE TO A "SEQUENTIAL LISTING, "A TABLE, OR COMPUTER PROGRAM LISTING APPENDIX SUBMITTED ON A COMPACT DISC

Not Applicable

BACKGROUND OF THE INVENTION (1) Technical Field of Invention

The technical field of the invention is aftermarket smoker conversion kits or systems for kettle grill or other charcoal burning grills. The conversion kit could also be sold along with or accompanying grills providing the ability to utilize a typical grill as a deluxe, multi-functional smoker as well.

(2) Description of Prior Art

Throughout the years there have been patented inventions that utilize some sort of apparatus to attempt to convert a kettle grill used for grilling various foods into a smoker, or slow cooker. Some of these inventions have been relatively successful at their intended result, and some have not. The present invention expands upon these inventions to the extent that it eliminates problems not addressed or solved in previous inventions.

At the core of any smoker conversion apparatus is the cylinder that must be placed in between the bottom portion of the grill which houses the fuel, or charcoal, and usually provides a support structure for the grilling rack and the upper portion of the grill which provides a cover for the grill and is utilized primarily to retain heat. This cylinder expands the interior space of the grill providing for an area in which the "smoking" can take place. The inner components of prior inventions lack functionality when compared to the present invention and its ability to utilize the given space. The present invention provides for larger or more expansive grilling and/or smoking and slow-cooking capacities through the use of a novel dome rack system used in conjunction with grilling racks. This is an improvement over the prior art.

BRIEF SUMMARY OF THE INVENTION

The present invention is an apparatus that consists of multiple components, including but not limited to, a smoker chamber, a dome rack, at least one grill rack, a large tray, a heat resistant pan or varying size, a multi-purpose pan support rack, extension clips to increase cook area, a basket grill rack, a novel fish hook cooking system and a steel cooking ring as well as a mounting adaptor for fixation to a stationary area such as an outdoor counter or kitchen.

The smoker chamber is a hollow cylindrical, rectangular or square body comprised of heat resistant material, such as but not limited to, aluminum or metal. The chamber will be coated in a heat and corrosion resistant paint on both its interior and exterior surfaces. This smoker chamber will rest on top of the existing grill bottom portion and underneath the top or upper portion of said grill in such a way as to form a seal that prevents the loss of both heat and smoke.

The chamber will have a telemetry port or hole on its side which will also have an accompanying plug or stopper to prevent loss of heat or smoke. This port will allow the user to test both temperature and moisture content within the smoker itself. The chamber is further fitted with heat resistant handles on its exterior surface for movement of the chamber, even when in use. On the interior surface of the chamber are corresponding support brackets to accommodate grill racks at different distances from the heat source and smoker pan.

One novel aspect of the smoker conversion kit is the domed grilling rack which allows the user to smoke or slow cook several whole fish, lobsters, whole hams or any number of longer profiled food items. The domed grilling rack rest on support brackets at the top or upper portion of the smoker chamber. It is comprised of two or more horizontal support structures, with the bottom most support structure have a diameter and shape matching the inner diameter and shape of the smoker chamber. Multiple upright or vertical support structures connect the horizontal support structures forming the dome shaped rack. These upright support structures curve in towards the center of the apparatus forming a dome shape. This dome rack extends upward into the interior space provided for within the top of the existing grill.

Multiple meat hooks can be removably attached to the dome shaped rack allowing meats to hang vertically within the smoker chamber. If the grill racks are removed from the grill or within the smoker chamber itself, large pieces of meat as long as two feet can be hung within the apparatus.

As with most smokers, a pan is necessary to be used in conjunction with the fuel or heat source. This invention provides for use of a heat resistant pan of sufficient size to accommodate several quarts of liquid. The pan has a lip extending outward about its upper peripheral edge.

The pan is placed upon or within the pan support rack, which can serve multiple functions in the smoking and grilling areas of use. The pan support rack, like the dome rack, has a plurality of horizontal support structures with the bottom most support structure having a greater diameter than the upper most horizontal support structure. Accompanying vertical support structures tie the pan rack together and bend inward. The upper most horizontal support structure corresponds to the diameter and circumference of the lip of the pan itself. As a result, the pan rests within the pan support rack. The pan support rack gives sufficient vertical clearance when used in conjunction with the pan itself for fuel sources and/or smoker chips to be place below the pan without interference with the effectiveness of the grill or smoker.

Furthermore, the pan support can be rotated onto its vertical or upper surface to accommodate the pan providing the user with the option to wet grill meat or other items without the use of the smoker chamber.

The smoker conversion kit also comes with a large flat tray that is utilized in removing the entire apparatus while the user adds fuel or liquid to the lower half of the grill. This tray is comprised of heat resistant material and has attached to it, heat resistant handles. The user can leave the lid on the smoker chamber and use the smoker chamber's exterior handles to place said chamber and lid onto the tray as opposed to a surface in which the chamber could collect dirt or a surface in which the contents of the smoker could damage due to dripping or heat. Another added benefit of the tray is that the contents continue to cook as heat is not lost through the bottom of the chamber when in contact with the tray. Moreover, the tray can be fitted with folding legs so as to stand alone eliminating the need to place the tray on another surface such as a counter-top or the ground.

The novel aspects of the invention include the domed rack, the pan rack and the use of the other aspects of the invention in conjunction with these racks to form a smoker conversion different and novel in view of prior art.

The smoker conversion kit also can be equipped with extension clips that allow the user to suspend a grill rack below the support brackets to double the capacity of the smoker at a higher level than the smoker chamber. Furthermore, the kit can be equipped with a basket grill rack to contain food items to prevent them from accidentally fall off of the rack, as would be seen in a conventional rack.

The smoker conversion kit can also be equipped with what are termed "fish hooks" which are actually an apparatus by and through which fish can be skewered and hung in a vertical fashion from the dome rack so as to smoker and grill fish without direct contact with a grill rack. This allows for the fish to be cooked as a whole without the need to flip from side to side. The fish hooks are used in conjunction with the dome rack. This, like many aspects of the smoker conversion kit, is not seen in the prior art.

The smoker conversion kit can also be equipped with a larger bowl and steel ring or fire ring. These are placed in the grill base. The steel rings helps to position the coals in a semi-circular fashion around the inside of the grill base for a long burning "low and slow" fire. The bowl will be filled with liquid and would be placed in the top of the ring to provide moisture to the atmosphere inside the smoker. The large bowl provides for longer cook times with need of replenishment of fluid. The steel ring can also be used in non-smoker related grilling functions by isolating the heat source to a confined area. This is off use in that it allows the user to better control the temperature in which the article being cooked is exposed. Obviously, heat rises. The area containing the coals on the will be a hotter heat source in that the coals are confined within a smaller area than the grill base.

The smoker conversion kit also comes with a mounting adaptor that facilitates the fixed mounting of the entire smoker into a certain location such as a counter top or outdoor kitchen.

DETAILED DESCRIPTION OF THE INVENTION

Figure 1:
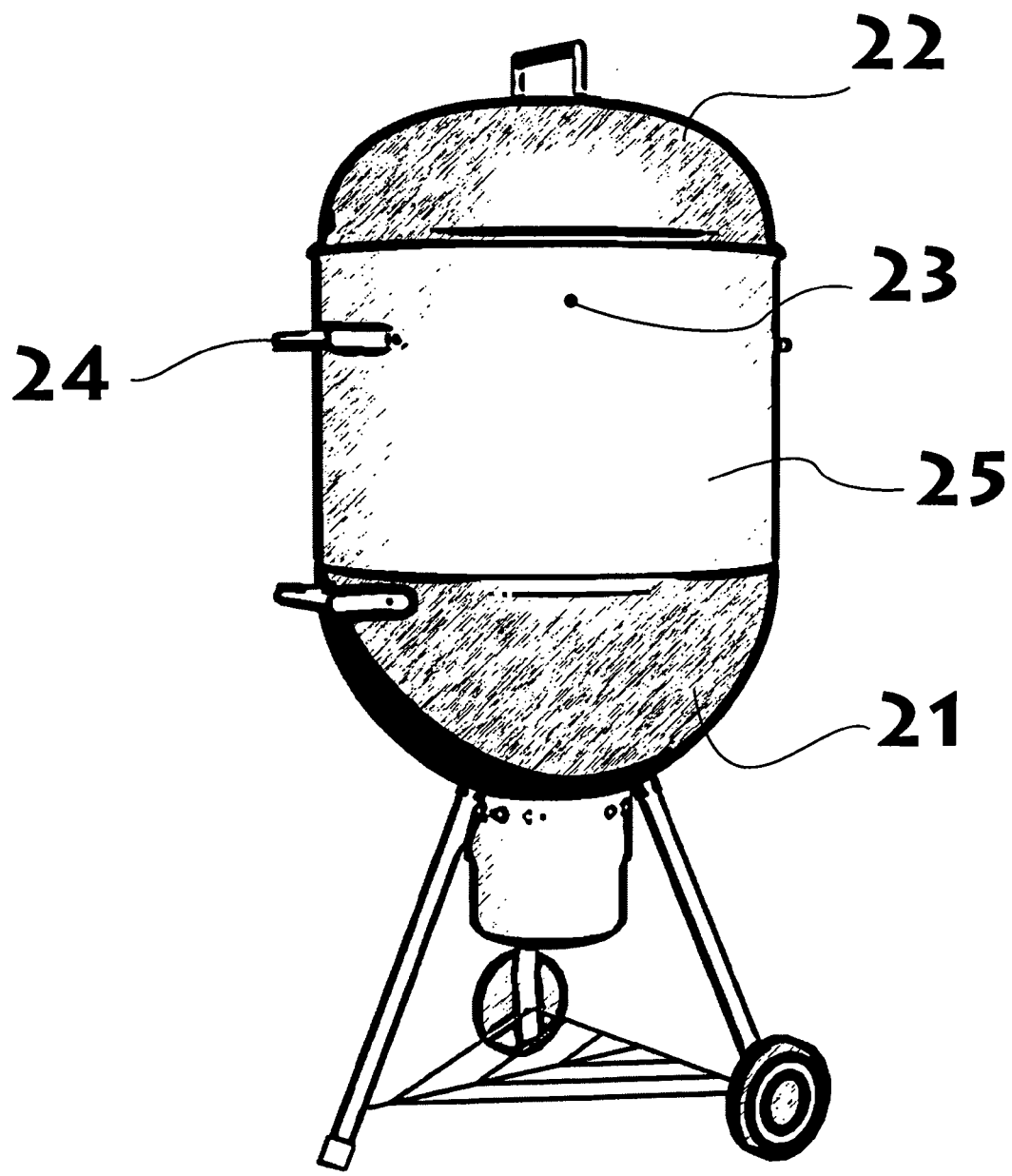
FIG. 1. illustrates the invention is use in conjunction with an existing grill with the smoker chamber visible.

Referring to FIG. 1 through FIG. 11, the invention in comprised primarily of a smoker chamber (25), a dome rack (26), at least one grill rack (31), a large tray (34), a heat resistant pan or bowl (30), a multi-purpose pan support rack (28), a basket grill rack (39), extension clips (40), fish hooks and skewers (41) and a mounting adaptor (42).

Referring to FIG. 1 through FIG. 5 and FIG. 7, the smoker chamber (25) is constructed to a specific size so as to allow conversion of an existing grill or grill template into a smoker. As such, the size and shape of the chamber (25) can vary depending on the needs of the user and the grill in which the user has access. The smoker chamber (25) will have an upper and lower lip (29) around its top and bottom peripheral edges to provide for a proper seal when used in conjunction with an existing grill. Ideally, the upper lip (29) will rest just inside the bottom portion of the lid (22) of the existing grill. Likewise, the lower lip (29) will securely fit inside or within the bottom portion (21) of the existing grill. The seal formed at the top and bottom should be of such a nature that heat and smoke will not easily escape when the grill and smoker conversion kit are in use. On the chamber's (25) exterior surface are at least two heat resistant handles (24) spaced on opposite sides of the chamber (25) so as to allow balanced movement of the chamber (25) and its components. The chamber (25) should be comprised of a heat tolerant material such as metal and should be coated in a heat resistant paint on its interior and exterior surfaces. The chamber (25) also has a telemetry port (23) which allows the user to test temperature and moisture content within the smoker when in use. The port (23) has an accompanying plug or stopper so no heat, smoke, or moisture is lost when the port (23) is not being used. Further, the chamber has corresponding support brackets (32) around its interior surface to accommodate grill racks (31) at different levels within the chamber (25).

Figure 2:
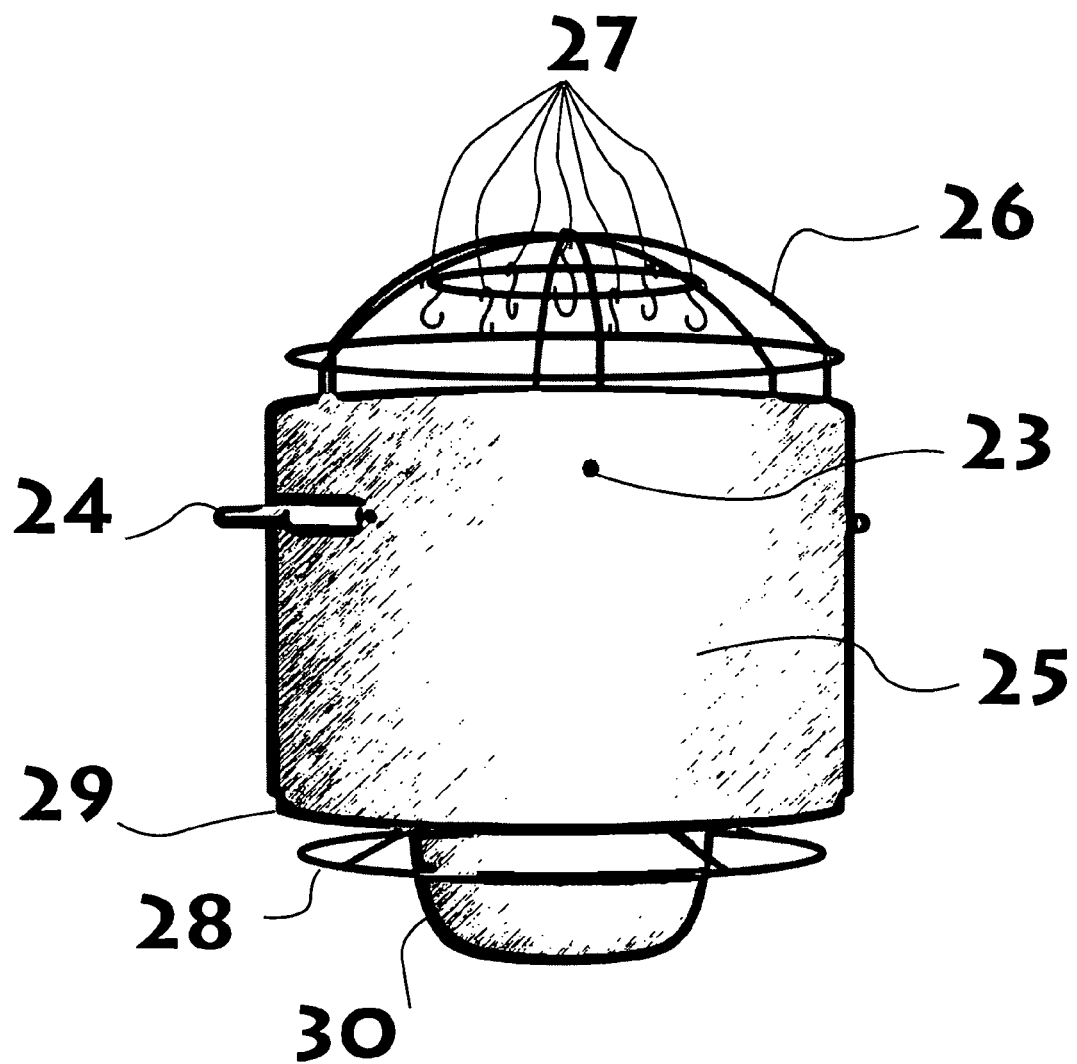
FIG. 2. illustrates the invention from a side profile with elements of the invention in view including the doom rack and hooks.
Figure 3:
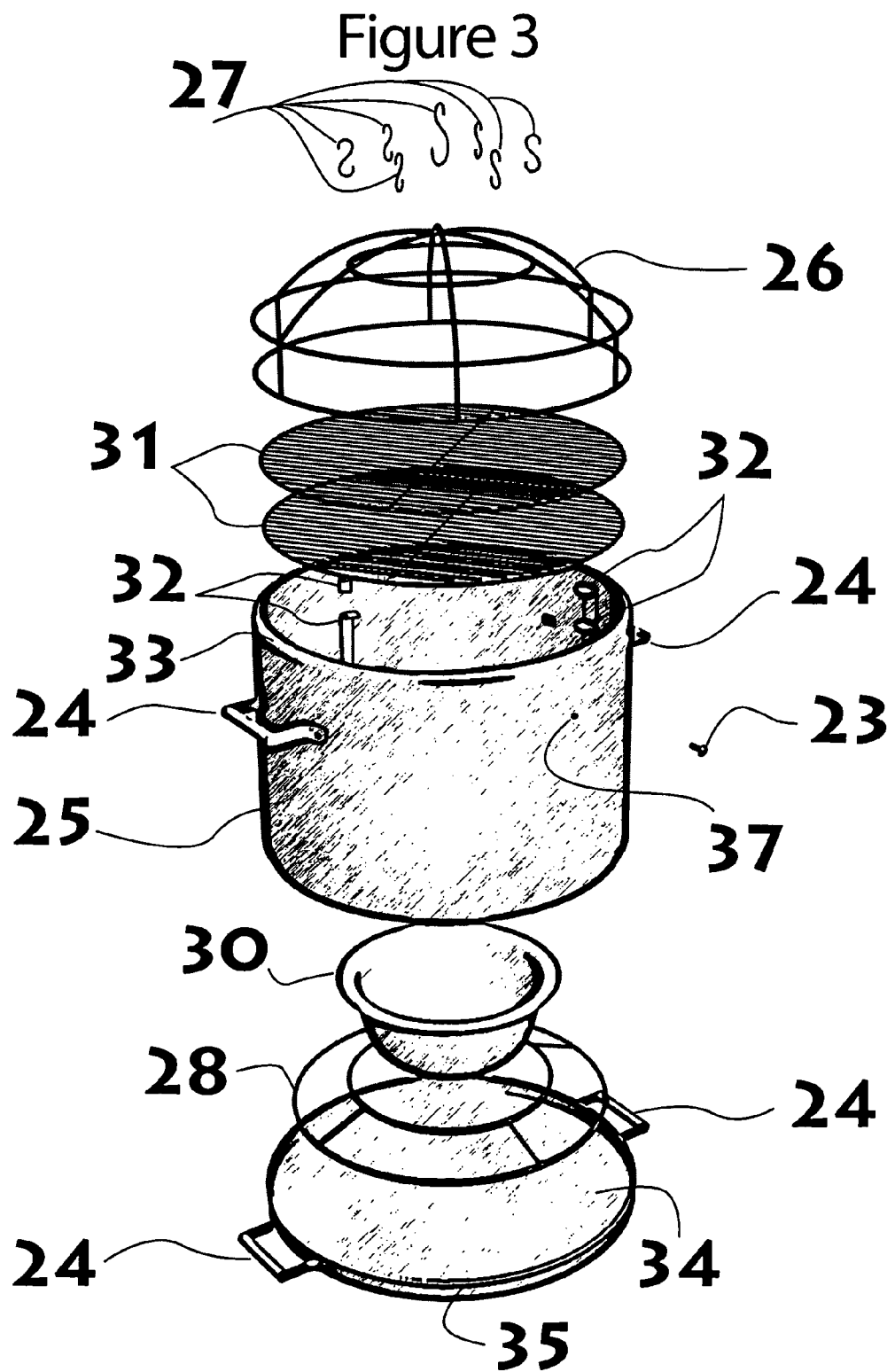
FIG. 3. illustrates a majority of the components of the invention.
Figure 4:
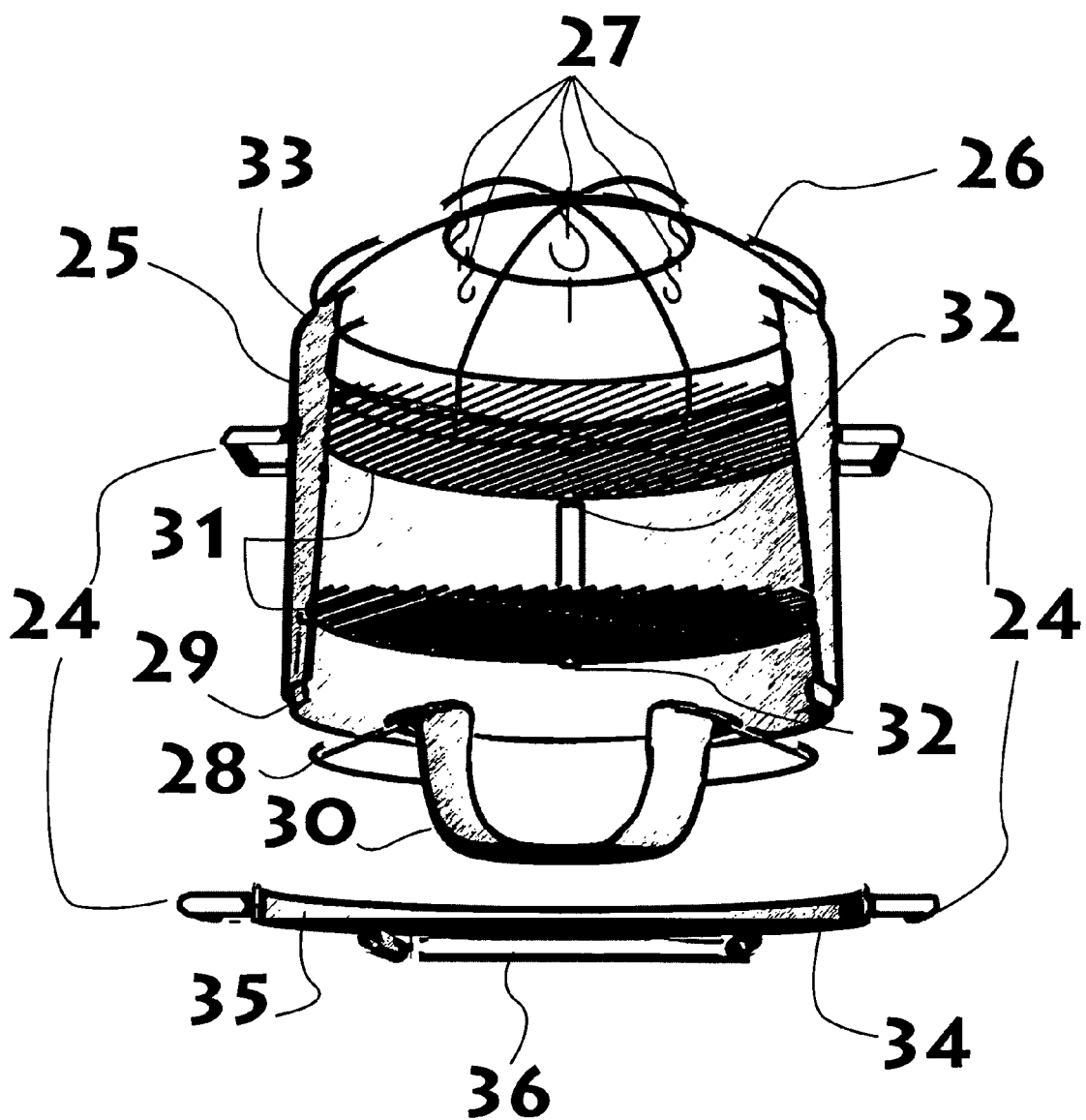
FIG. 4. Illustrates the side profile of the invention allowing viewing within the invention itself with doom rack and hanging hooks in view.
Figure 5:
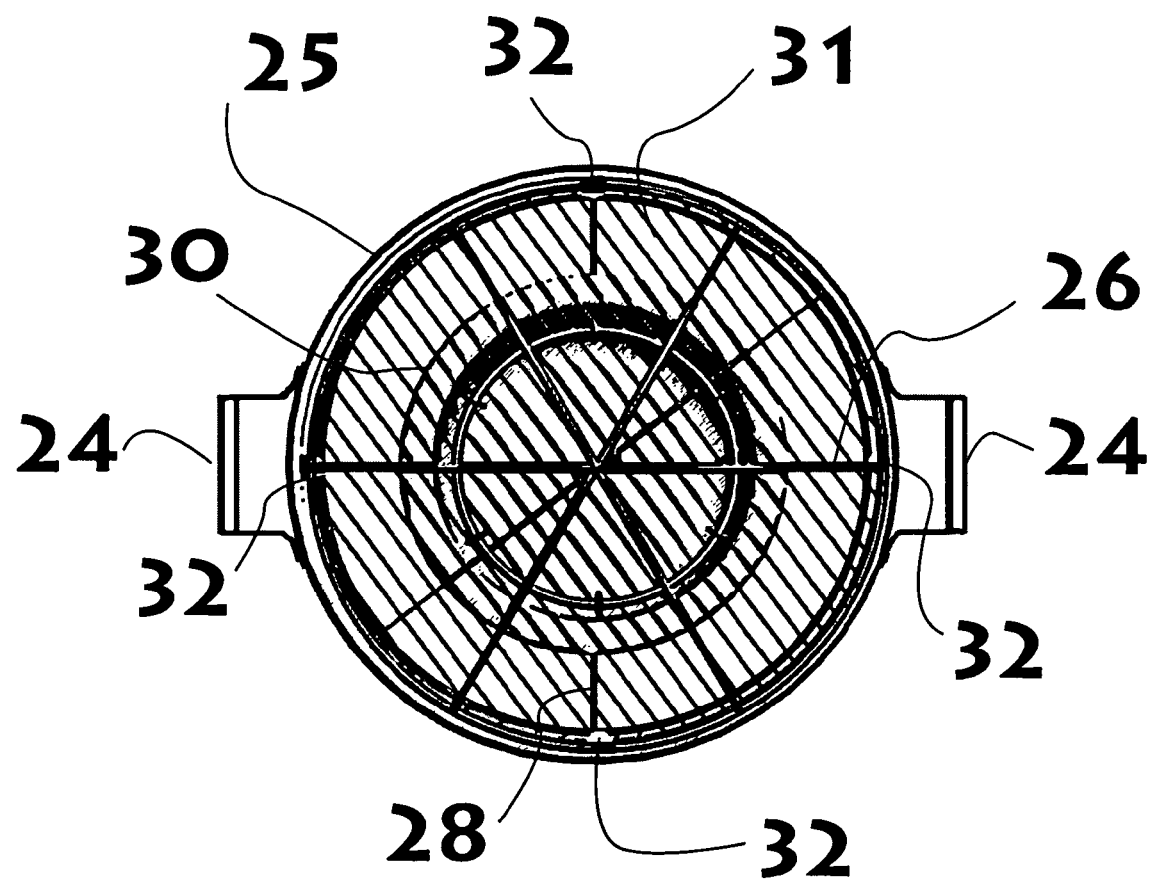
FIG. 5. Illustrates the invention as viewed from the top.
Figure 7:
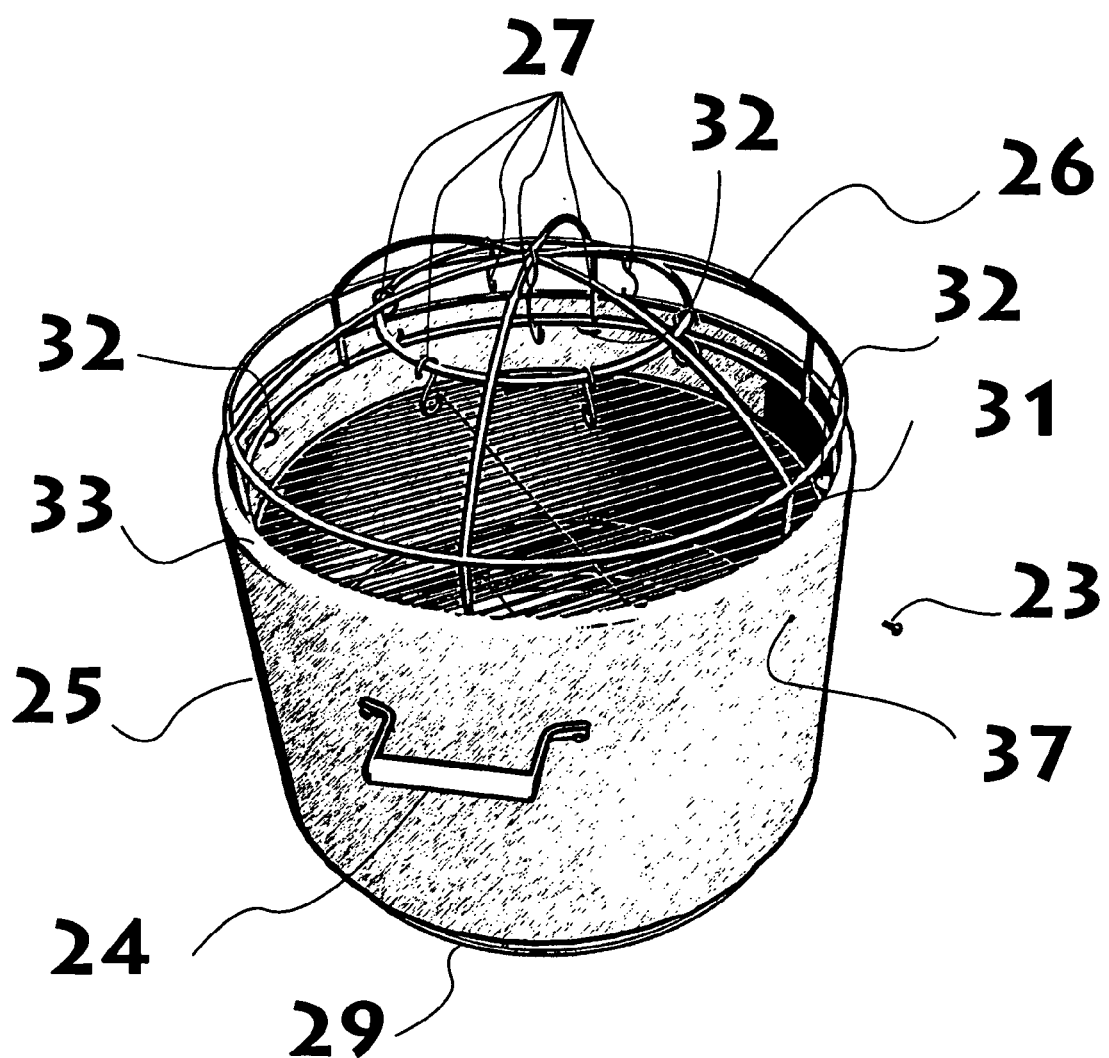
FIG. 7 Illustrates the another top profile of the smoker conversion kit and its components in use.

Referring to FIGS. 2, 3 and 4 as well as FIG. 7, the interior aspects of the invention are the dome rack (26) with accompanying meat hooks (27), the pan (30) with accompanying pan rack (28), the grill rack or racks (31) which rest on the support brackets (32) attached to the interior surface of the chamber (25). The dome rack (26) is a very novel aspect of the invention in that it provides for use in cooking or smoking large pieces of food within a relatively small space. The dome rack (26) is comprised of horizontal and vertical support structures, with the vertical structures bending inward forming a "dome" shape. The lowermost horizontal support structure rests on support brackets (32) within the chamber (25). The dome rack (26) should be comprised of a heat tolerant material such as steel or metal. Meat hooks (27) can be attached to the vertical support structures and large pieces of meat, or other food, can be hung vertically within the chamber (25). The meat hooks are removably attached to the dome rack (26) and utilize gravity and the weight of the food attached thereto to secure the hooks (27) in place. The hooks (27), like the rest of the invention, should be comprised of a heat tolerant to heat resistant material.

Referring to FIG. 2 through 4 and FIG. 7, the invention utilizes a liquid pan (30) that has a lip around its peripheral edge. This pan (30) is used to hold liquid and/or wood chips for smoking the contents of the smoker and can also be utilized in wet grilling applications with the chamber (25) is not in use. The pan (30) is held in place by a pan rack (28), which like the dome rack (26), has horizontal and vertical support structures. The pan (30) and pan rack (28) will rest inside the existing bottom portion (21) of the grill. The upper most horizontal support structure is approximately the diameter of the lip around the pan (30), allowing the pan (30) to rest inside the pan rack (28). The pan rack (28) gives sufficient vertical clearance over the heat source so as not to disturb or impede said heat source. The pan (30) should be comprised of a heat tolerant substance that has the ability to transfer heat to its contents without a breakdown of the material comprising the pan (30) itself due to direct contact with the heat source. Likewise, the pan rack (28) should be comprised of a heat tolerant material which is also very sturdy, such as metal or steel.

Figure 6:
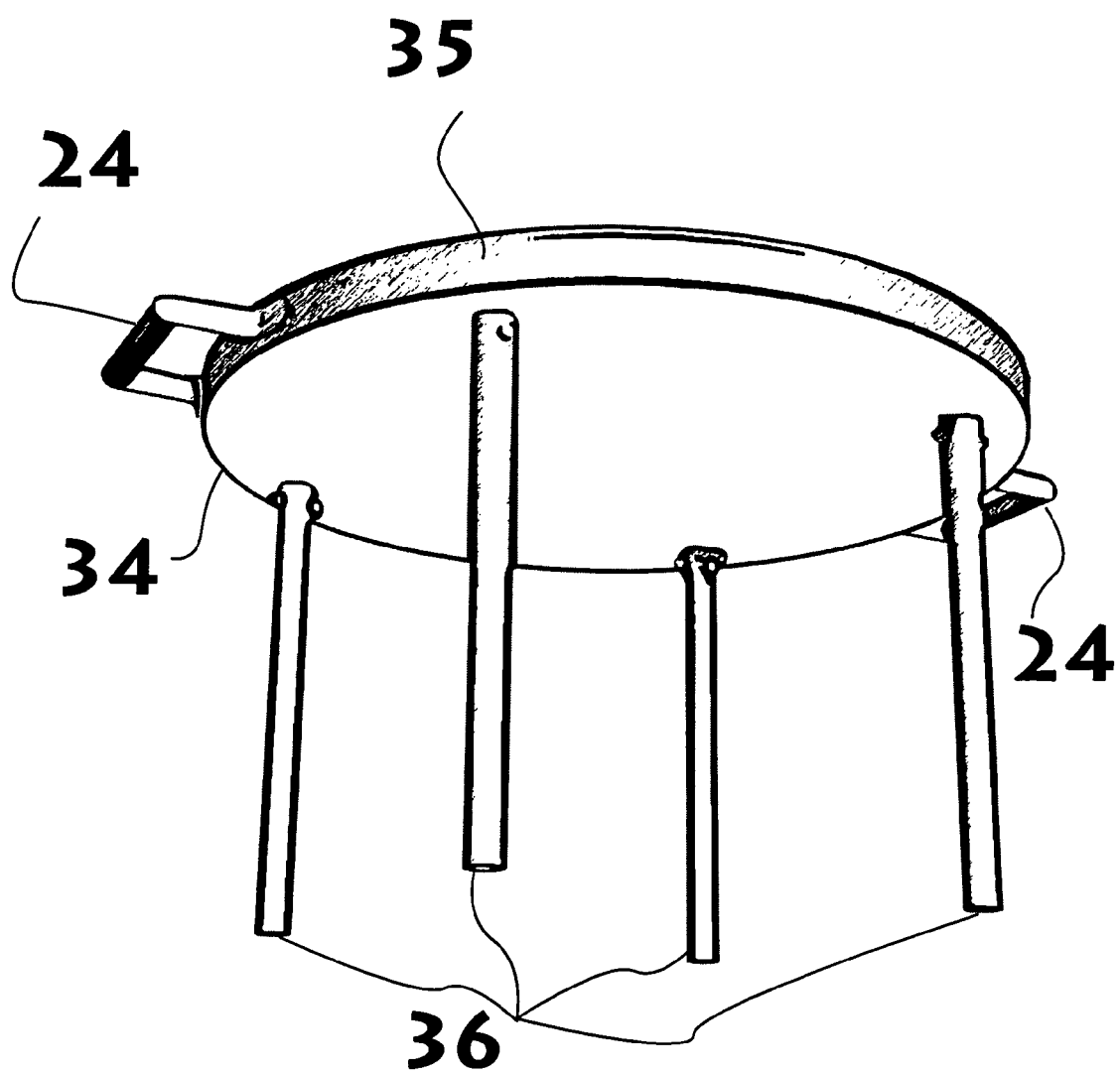
FIG. 6. Illustrates the tray aspect of the invention with the legs extended into a locked position in use.

Referring to FIG. 6 in particular, another aspect of the invention that can be used in conjunction with the removal of the chamber (25) is the tray (34). The tray (34) is comprised of heat tolerant material. It has corresponding handles (24) and a lip (35) about its peripheral edge to prevent contents within the smoker from soiling the surfaces upon which the tray is placed. A unique feature to the tray is that it has attached to its bottom surface folding legs (36) which allows the user the option to have said tray (34) elevated or not elevated. The tray (34) should be of sufficient size to accommodate the placement of the chamber (25) within the vertical lip (35) of said tray (34).

Figure 8:
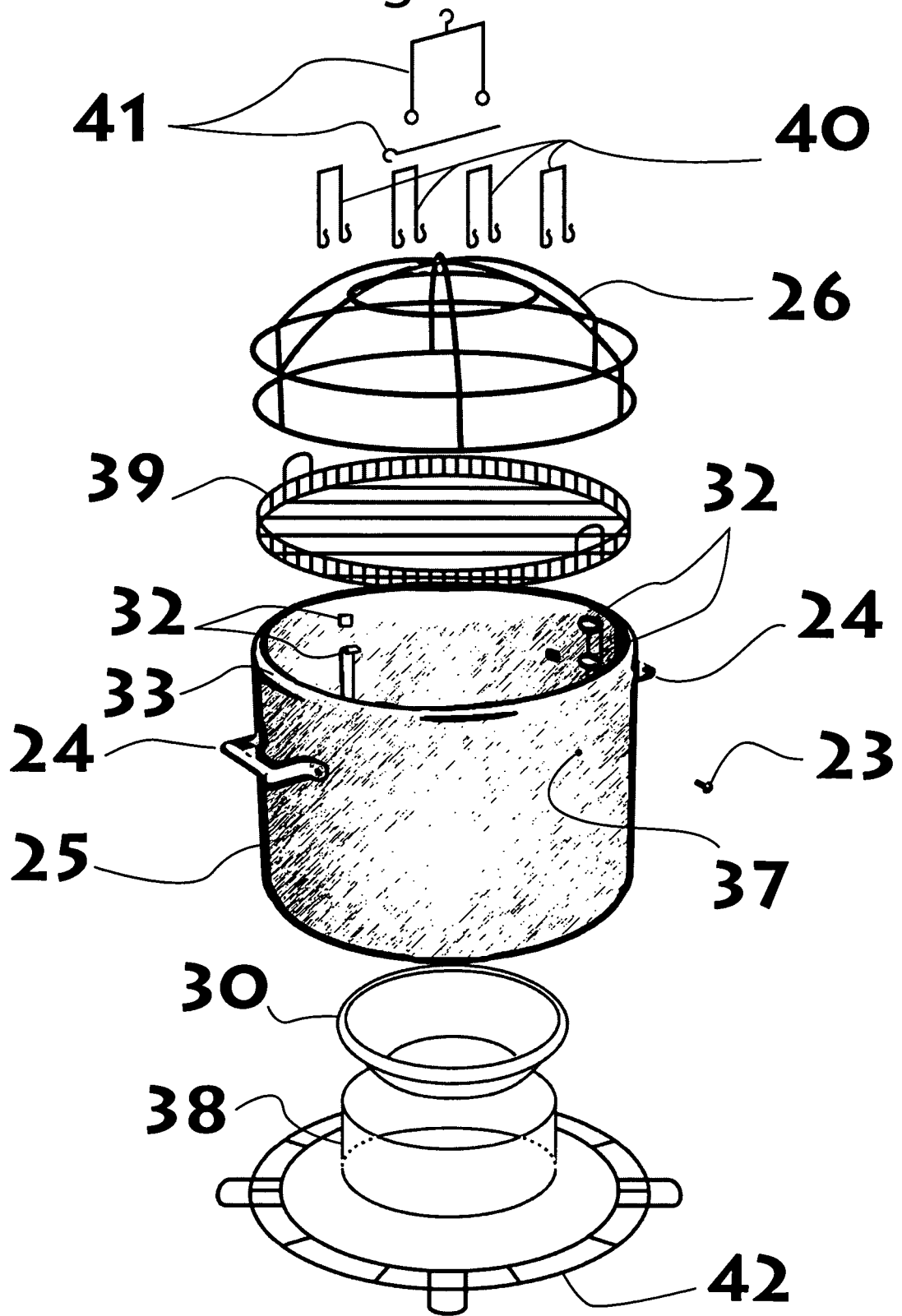
FIG. 8. Illustrates the dome rack uses in conjunction with the fish hooks as well as illustrates the use of the larger bowl, fire ring and mounting bracket.
Figure 9:
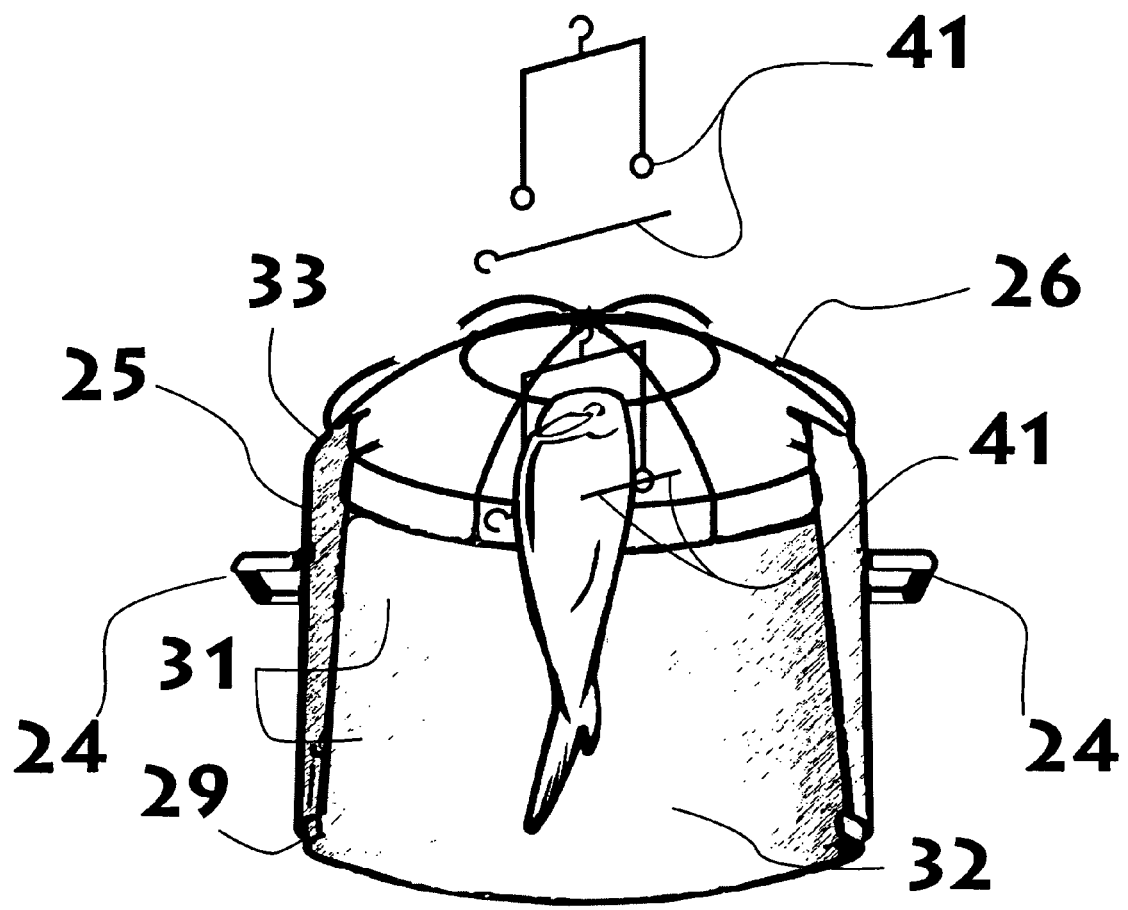
FIG. 9. Illustrates the fish hook mounts and skewer as used in conjunction with the dome rack.
Figure 10:
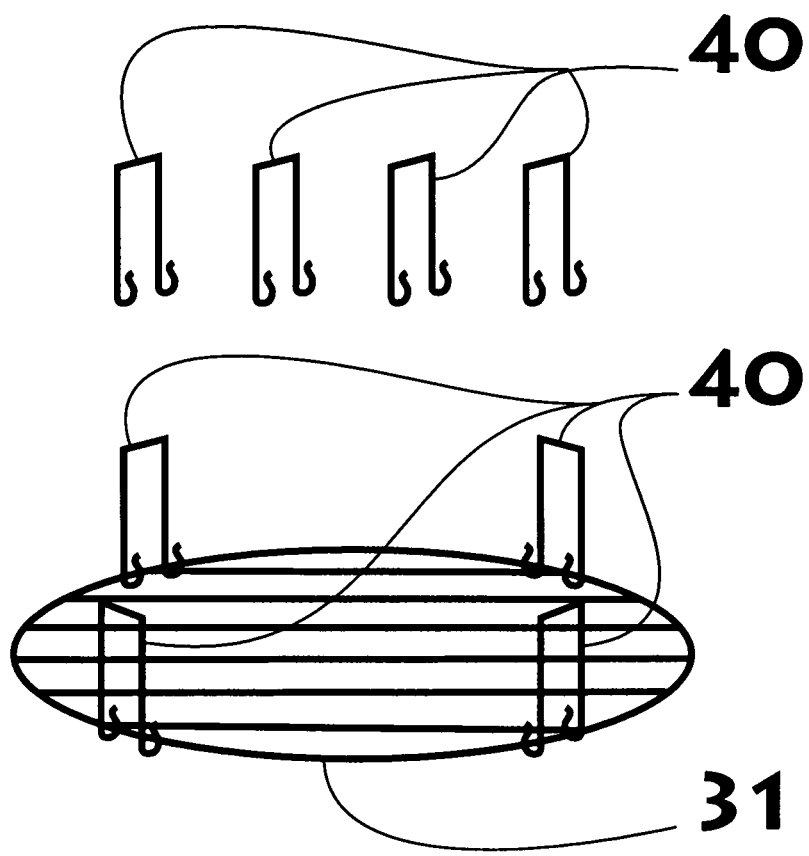
FIG. 10. Illustrates the extension clips used in conjunction with a generic grill rack.

Referring to FIGS. 8 through 10, the smoker conversion kit also allows for the use of extension clips (40) that allow the user to suspend a typical charcoal grill rack (31) below the support brackets (32) to in essence double the capacity of the smoker at a higher level in the smoker chamber (25). The extension clips (40) are formed from a durable wire comprised of steel, aluminum or alloy and clip into the existing support brackets (32) in a secure fashion. Likewise the secure to a standard grill rack (31) in a secure fashion so as not to allow said rack to fall when a weight bearing load is placed thereupon, such as a specific meat item. Not only do the clips (40) allow for more use within the chamber (25), they provide the user with the ability to regulate heat on the substance being cooked by reference to proximity to the heat source. A larger and/or thicker piece of meat may need to be closer to a particular heat source to cook through in a timely manner. The extension clips (40) provide an avenue upon which to accomplish this task in a secure fashion.

Referring to FIG. 8, the basket grill rack (39) is seen. The basket grill rack (39) is typically used as the top if a person were to be using the extension clips (40) to cook on a grill rack (31) suspended below the top level of the support brackets (32). With this being the case, the user may need to remove the upper rack to access the lower rack to baste or tend to the meat or food item in the rack in use in conjunction with the extension clips (40). The basket grill rack (39) allows for ease of removal without fear of meat sliding off the rack due to the raised sides of the basket. The basket is formed from the same material as a typical grill rack (31) and utilizes this same material to form a vertical peripheral edge. The basket grill rack (40) could then be used in conjunction with the heat resistant tray (34) while the food substance on the grill rack in use with extension clips (40) is tending to by the user.

The supporting ring (38) is also seen in FIG. 8. This ring (38) is used in conjunction with a larger bowl (30) or can be used alone. The ring (38) is placed within the lower portion (21) of the existing grill and can have charcoal or another heat source placed within itself, or on its exterior. More commonly, the heat source will be placed within the ring (38) and the bowl (30) placed on top of the ring. The need for a larger bowl (30) accomplishes two related tasks. It prevents the user from having to add liquid as often due to larger volume and it likewise uses said larger volume to combat more direct relation to the heat source than with the support rack (28). The ring (38) can be formed from any suitable heat tolerant material such as, but not limited to, steel, aluminum, alloy, porcelain, etc. Moreover, the ring (38) can be perforated to assist in the drawing of oxygen from the atmosphere to feed the heat source. The ring (38) has separate use in grilling applications wherein the user places the heat source within the ring (38) and does not place a bowl (30) on top. The food source can be placed directly on top of a rack (31) which in turn is placed on top of the ring (38). For direct heat, the food source should be placed directly over the heat source within the ring (38). Likewise, indirect heat can be acquired by placing the food on the outside of the ring's (38) peripheral edge. The user can then be allowed to more accurately cook meats, such as steak, to a desired liking as they can control what heat the meat is exposed to thereon. A less common, but still effective use of the ring (38) would be to place the heat source on the outside of the ring (38). Heat variation takes place the opposite of that described above in grilling applications. Moreover, in smoking applications, the liquid contents of the bowl (30) are not exposed to heat as intense as if the heat source were within the ring which further prolongs the presence of the contents of the bowl (30) for less evaporative effect.

Referring to FIG. 8 through 10, a fish hook and skewer system (41) is available and provides for secure cooking of fish in a thorough fashion without necessity to flip the fish during the smoking process. The hook and skewer system (41) hangs from the domed rack (26) and is comprised of a U-shaped bracket with rounded eyelets at the two respective tips of the U and a hook of sufficient circumference to securely attach over the elements comprising the dome rack (26). A skewer with a pointed end and a blunted end fits securely within the eyelets of the U-shaped bracket. The typical fish will have the pointed end of the skewer inserted through its body three to four ribs sections down from the head within the u-shaped bracket. The skewered fish securely mounted to the u-shaped bracket is then hung from the dome rack (26) and will hang vertically within the smoker chamber (25).

Figure 11:
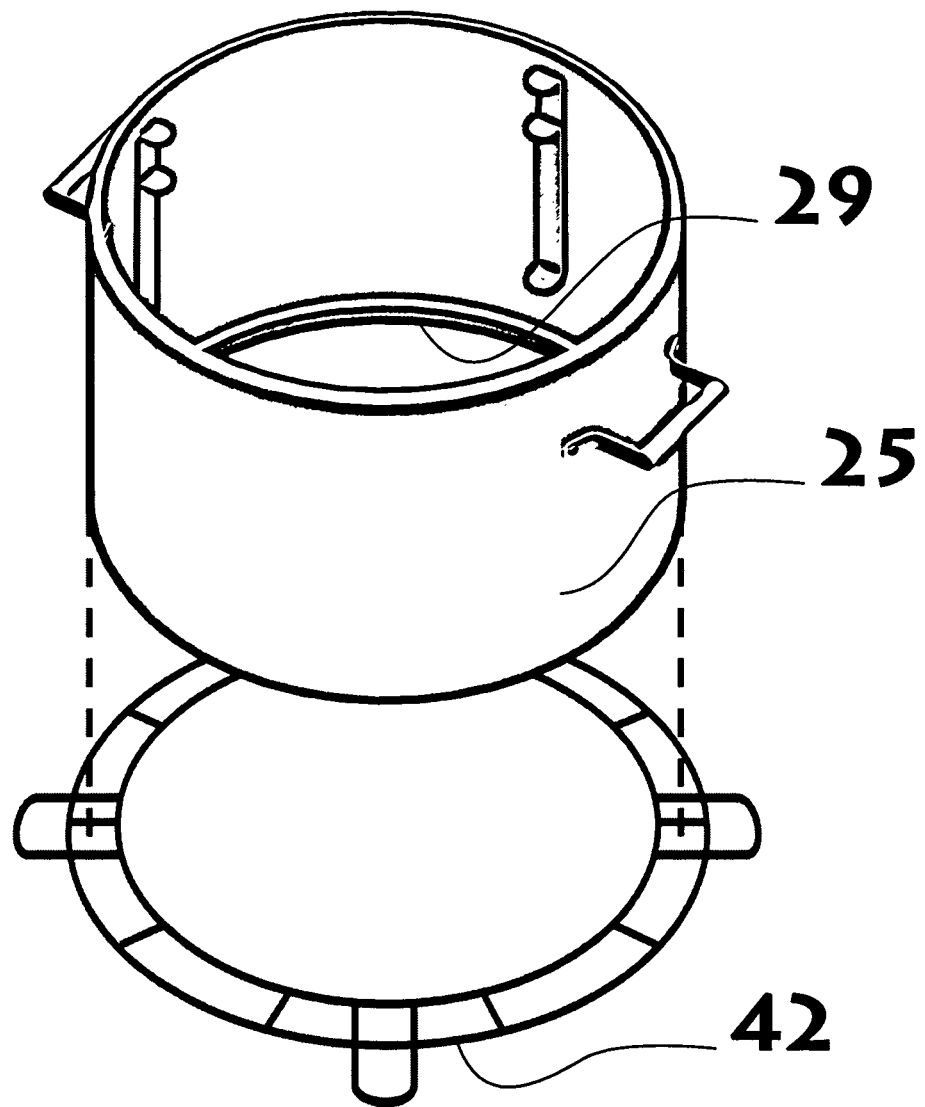
FIG. 11. Illustrates the mounting adaptor as it relates to the upright smoker chamber.

Referring to FIG. 8 and FIG. 11, a mounting bracket (42) is provided to externally secure the smoker chamber (25) or the lower portion of the existing grill (21) to a fixed location such as a counter top. The mounting bracket (42) is comprised of a double ring that facilitates protective space between the grill base (21) or chamber (25) and the surface of the fixed position upon which it is affixed. The mounting bracket (42) should be manufactured from any appropriate heat tolerant material. The bracket (42) could be mounted to a rolling cart for movement of the entire apparatus with relative ease. The bracket (42) also functions as a safety feature in that a grill and/or smoker fixably mounted to a stationary and secure object is less likely to turn over an injure the user.

Referring to FIG. 1 and FIG. 11, if the user desires to convert his grill to a smoker utilizing this invention, the user should first remove the top or lid (22) from the existing grill. The user will then remove the grill rack (31) that comes standard with the grill. The fuel or heat source will then be placed within the bottom portion (21) of the existing grill. The pan rack (28) and pan (30) will then be placed over the heat source. The user can place the desire liquid and/or aromatic solid within the pan. The user can, if desired, place the removed grill rack (31) back in place. The smoker chamber (25) will then be placed on top of the bottom portion of the grill (21). If the user desires, grill racks (31) can be placed onto support brackets (32) within the chamber (25) and food placed on the racks (31). The dome rack (26) is then placed on the upper most support brackets (32) within the chamber (25) and meat, or other foods, can be hung from the dome rack (26) by the meat hooks (27). The top portion or lid (22) of the existing grill is then placed upon the upper lip (29) of the chamber (25). The invention is now in place and ready to be used. The chamber (25) can be removed and placed on the tray (34) for removal of food within the chamber (25), or for addition of contents to the pan (30) and adjustment of the heat source. Moreover, the doom rack (26) can be used in conjunction with the fish hook and skewer system (41). Likewise, the extension clips (40) provide for added room within the chamber (25) for smoking applications. The basket grill rack (39) can be used in conjunction with the smoker to facilitate safe and secure remove of meats or other food items. The grill rack (31) can be removed and replaced with the heat ring (38) which in turn can support a larger bowl (30). The heat ring (38) provides for direct heat assistance in grilling applications.

DRAWINGS

The drawings referenced in this application are attached hereto.

I claim:

1. A smoker conversion apparatus consisting of: an upright smoker chamber having an open top and bottom;
   the chamber being fitted with corresponding support brackets around its interior surface and heat resistant handles on its exterior surface;
   the chamber being able to position in a sealable fashion between the bottom portion of an existing grill and the grill lid or top portion of an existing grill;
   a dome rack having horizontal support structures attached in a fixed manner to vertical support structures;
   a top horizontal support structure being smaller in diameter than the other horizontal support structures;
   the vertical support structures being contoured to attach to the horizontal support structures of varying diameters and being further contoured to conform to the shape of the existing grill lid or top portion;
   one or more grill racks of corresponding size and shape to the existing grill;
   a large tray of corresponding size and shape to the chamber;
   a heat resistant pan having a lip around its upper peripheral edge;
   a pan support rack having horizontal and vertical support structures with the top horizontal support structure being smaller in diameter than the bottom support structure;
   the top horizontal support being of a corresponding diameter to the pan to hold the pan in place in a secure fashion when the pan is place on the pan support rack;
   multiple meat hooks removably attached to the top horizontal support structure of the dome rack;
   a tray with folding legs to accommodate the apparatus when removed from the existing grill;
   a telemetry port with an accompanying plug or stopper in the side of the smoker chamber;
   a plurality of durable heat tolerant extension clips that securely attached to a grill rack and support brackets;
   a grill basket rack having raised edges around its peripheral edge;
   a hook and skewer combination comprising a u-shaped portion having rounded eyelets at the bottom tips of the u-shape and a hook in the top center portion of the u-shape of sufficient diameter to attach to the dome-shaped rack, and further having a skewer which is pointed on one end and blunt on the other, the skewer of sufficient diameter to fit within the rounded eyelets of the u-shaped portion;
   a heat ring of cylindrical shape having open bottom and top portions; and
   a mounting adaptor comprising concurrent rings, one of slightly smaller diameter than the other, fixably attached to one another with the mounting adaptor having structural components facility secure attachment to a fixed surface and attachment to a grill or the smoker chamber by way of loops or holes attached to the inner and outer concurrent rings.

2. The apparatus as in claim 1, further wherein:
the chamber being cylindrical in shape.

3. The apparatus as in claim 1, further wherein:
the chamber being rectangular in shape.

4. The apparatus as in claim 1, further wherein:
the chamber being square in shape.

5. The apparatus as in claim 1, further wherein:
the dome rack and the pan support rack correspond in shape to the chamber.

6. The apparatus as in claim 1, further wherein:
the dome rack and the pan support rack are comprised of a heat resistant substance that is tubular in structure.

7. The apparatus as in claim 1, further wherein:
the chamber is coated in a heat resistant paint or finish.

8. The apparatus as in claim 1, further wherein:
the pan support is of sufficient vertical clearance within the framework of the pan support to accommodate fuel and smoker chips.

9. The apparatus as in claim 1, further wherein:
the pan support can be rotated onto its upper surface and utilized in conjunction with the heat resistant pan in moist grilling applications.

10. The apparatus as in claim 1, further wherein:
the heat ring is perforated.

* * * * *